United States Patent
Ahmadian et al.

(10) Patent No.: US 7,650,463 B2
(45) Date of Patent: Jan. 19, 2010

(54) SYSTEM AND METHOD FOR RAID RECOVERY ARBITRATION IN SHARED DISK APPLICATIONS

(75) Inventors: Mahmoud Ahmadian, Pflugerville, TX (US); Anthony Fernandez, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 79 days.

(21) Appl. No.: 12/105,002

(22) Filed: Apr. 17, 2008

(65) Prior Publication Data

US 2008/0215912 A1    Sep. 4, 2008

Related U.S. Application Data

(63) Continuation of application No. 11/114,675, filed on Apr. 26, 2005, now Pat. No. 7,363,426.

(51) Int. Cl.
*G06F 12/00* (2006.01)

(52) U.S. Cl. .................. 711/114; 711/158; 711/170; 713/2; 714/3; 714/6; 719/325

(58) Field of Classification Search .............. 711/114, 711/158, 170; 713/2; 714/3, 6; 719/325
See application file for complete search history.

(56) References Cited

U.S. PATENT DOCUMENTS

| | | | |
|---|---|---|---|
| 6,158,017 A | 12/2000 | Han et al. | 714/6 |
| 6,516,425 B1 | 2/2003 | Belhadj et al. | 714/6 |
| 6,549,977 B1 * | 4/2003 | Horst et al. | 711/113 |
| 6,567,892 B1 | 5/2003 | Horst et al. | 711/114 |
| 6,647,514 B1 | 11/2003 | Umberger et al. | 714/42 |
| 6,775,794 B1 | 8/2004 | Horst et al. | 714/42 |
| 6,823,424 B2 | 11/2004 | Larson et al. | 711/114 |
| 2005/0081088 A1 * | 4/2005 | Tanaka et al. | 714/5 |

* cited by examiner

*Primary Examiner*—Stephen C Elmore
(74) *Attorney, Agent, or Firm*—Baker Botts L.L.P.

(57) ABSTRACT

A RAID controller is provided for each host sharing a RAID. Each RAID controller can determine whether another host is sharing the RAID and assume a master or slave status with respect to rebuild operations for the shared disk. The master controller may then manage any rebuild operations on rebuild disks within the RAID.

20 Claims, 3 Drawing Sheets

SYSTEM AND METHOD FOR RAID RECOVERY ARBITRATION IN SHARED DISK APPLICATIONS

RELATED APPLICATION

This application is a Continuation of U.S. application Ser. No. 11/114,675, filed Apr. 26, 2005, now U.S. Pat. No. 7,363, 426. The contents of that application are incorporated herein in their entirety by this reference.

TECHNICAL FIELD

The present invention is related to the field of computer systems and more specifically to a system and method for RAID recovery arbitration in shared disk applications.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To provide the data storage demanded by many modern organizations, information technology managers and network administrators often turn to one or more forms of RAID (redundant arrays of inexpensive/independent disks). Typically, the disk drive arrays of a RAID are governed by a RAID controller and associated software. In one aspect, a RAID may provide enhanced input/output (I/O) performance and reliability through the distribution and/or repetition of data across a logical grouping of disk drives.

RAID may be implemented at various levels, with each level employing different redundancy/data-storage schemes. RAID 1 implements disk mirroring, in which a first disk holds stored data, and a second disk holds an exact copy of the data stored on the first disk. If either disk fails no data is lost, because the data on the remaining disk is still available.

In RAID 3, data is striped across multiple disks. In a four disk RAID 3 system, for example, three drives are used to store data and one drive is used to store parity bits that can be used to reconstruct any one of the three data drives. In such systems, a first chunk of data is stored on the first data drive, a second chunk of data is stored on the second data drive, and a third chunk of data is stored on the third data drive. An Exclusive OR (XOR) operation is performed on data stored on the three data drives, and the results of the XOR are stored on a parity drive. If any of the data drives, or the parity drive itself, fails the information stored on the remaining drives can be used to recover the data on the failed drive.

In RAID systems that utilize shared disks in a host based RAID storage system problems often arise related to the "ownership" of a shared recovery disk. For example, in shared disk applications (applications in which two hosts share a RAID) a disk within the RAID may fail and need to be rebuilt. Problems often occur in determining which host will manage the rebuild operation of the replacement disk. Host based RAID firmware typically connects to an external JBOD (Just a Bunch of Disks) and has the added task of synchronizing its view of the storage with peers in the cluster via a shared bus. In the case of so-called "share nothing" clusters such as a Microsoft Cluster Server access to a disk within a RAID is only allowed by the concept of ownership. In these systems, rebuild of a degraded RAID disk is performed by the member of the cluster that owns the disk that is being rebuilt. However, in shared disk clusters such as Oracle Real Application Clusters (RACs) the concept of ownership does not exist. Accordingly, problems occur when a shared disk becomes degraded and it is unclear which host within a cluster will repair or rebuild the degraded disk.

SUMMARY

Therefore a need has arisen for a system and method for reducing the rebuild time of RAID drives.

The present disclosure describes a system and method for RAID recovery arbitration in shared disk applications.

A RAID controller is provided for each host sharing a RAID. Each RAID controller can determine whether another host is sharing the RAID and assume a master or slave status with respect to rebuild operations for the shared disk.

In one aspect an information handling system includes a RAID having multiple storage disks and a first host and second host both in communication with the RAID. The first host includes a first RAID controller. The second host includes a second RAID controller. Each RAID controller is able to determine whether another host is sharing the RAID. In response to determining that no other host is sharing the RAID the RAID controller will assume a master controller status. In response to determining that there is another host sharing the RAID a RAID controller will assume a slave controller status. The master controller then manages the rebuild operation of a rebuild disk within the RAID.

In another aspect, a RAID controller is disclosed that acts to communicate with a RAID in a shared disk environment. The RAID controller includes firmware able to determine whether another host is sharing the RAID and assume a master controller status in response to determining that no other host is sharing the RAID. As a master controller the firmware is then able to manage a rebuild operation on a rebuild disk within the RAID. If the firmware determines that another host is sharing the RAID, the firmware assumes a slave controller status.

In yet another embodiment a method is disclosed including providing a RAID having multiple storage disks and providing a first host in communication with the RAID and having a first controller. The method further includes determining, using the first RAID controller, whether another host is sharing the RAID and assuming a master controller status in response to determining that no other host is sharing the RAID. In response to determining that another host is sharing the RAID, the method includes assuming a slave controller status. If a master status has been assumed the method includes managing a rebuild operation on a rebuild disk within the raid with the master controller.

The present disclosure includes a number of important technical advantages. One important technical advantage includes providing a RAID controller that can determine whether another host is sharing the RAID. This allows a RAID controller to assume a master or slave status with respect to the RAID and thereby arbitrate rebuild operations for failed storage resources. Additional advantages will be apparent to those of skill in the art from the figures, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
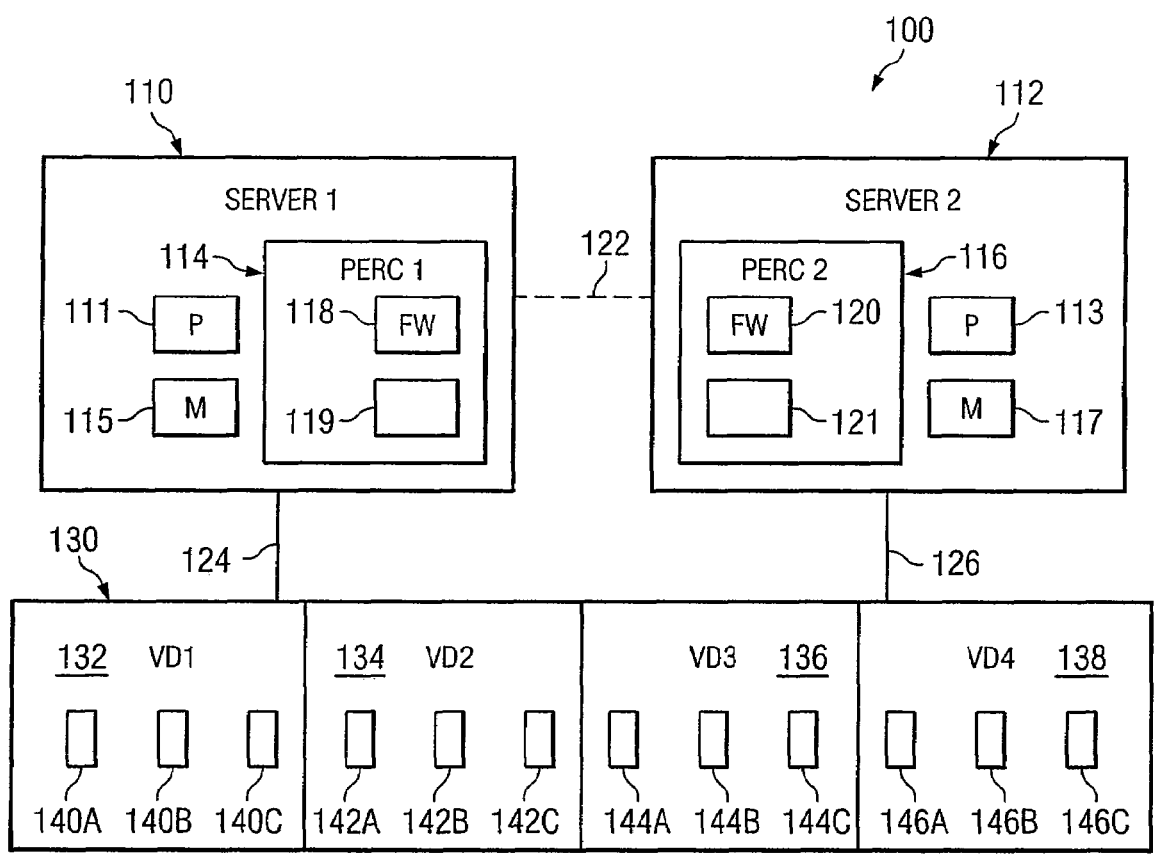
FIG. 1 is a diagram of an information handling system according to teachings of the present disclosure.
Figure 2:
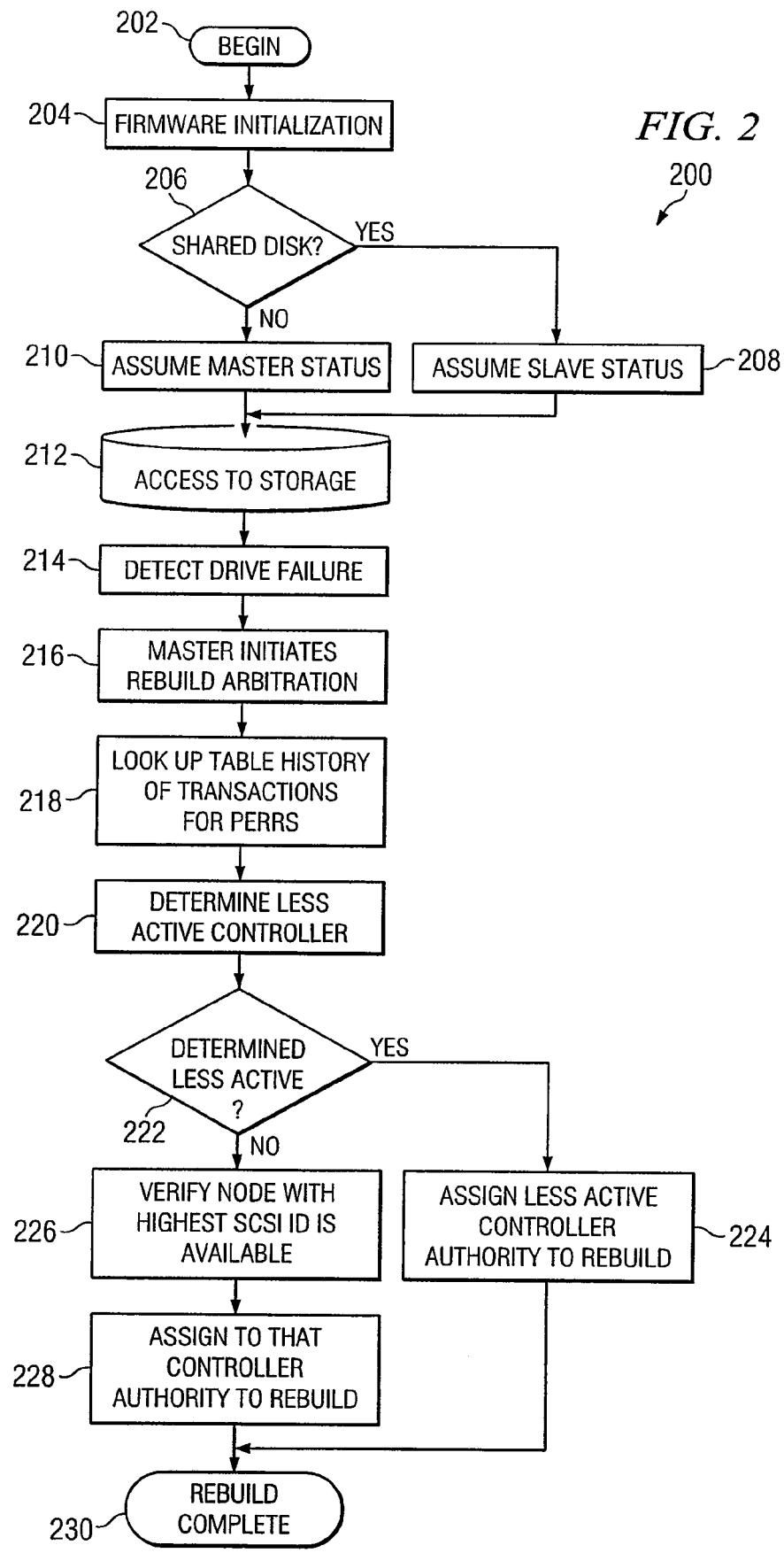
FIG. 2 is a flow diagram showing a method according to teachings of the present disclosure.
Figure 3:
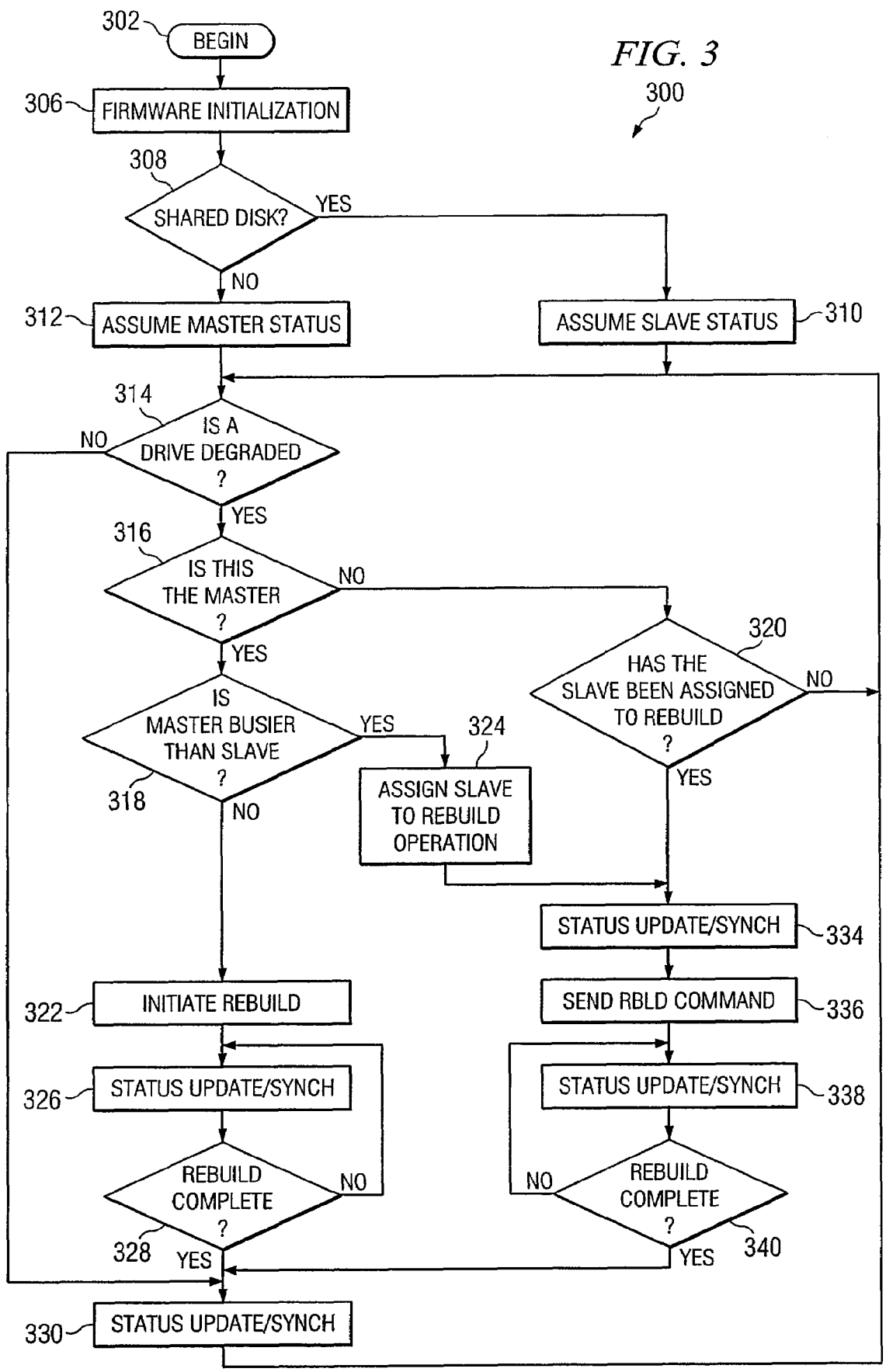
FIG. 3 is a flow diagram showing a method according to teachings of the present disclosure.

Preferred embodiments of the invention and its advantages are best understood by reference to FIGS. 1-3 wherein like numbers refer to like and corresponding parts and like element names to like and corresponding elements.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Now referring to FIG. 1, an information handling system generally indicated at 100 is shown. Information handling system 100 includes redundant array of inexpensive disks (RAID) 130 in communication with first server 110 and second server 112. First server 110 and second server 112 may be referred to as a cluster. Servers 110 and 112 may also be referred to herein at hosts. First server 110 includes processor resource 111 and memory resource 115. First server 110 also includes first RAID controller 114. Second server 112 includes processor resource 113 and memory resource 117. Second server 112 includes second RAID controller 116.

In the present exemplary embodiment, RAID controllers 114 and 116 are PowerEdge RAID controllers, however, the present disclosure contemplates alternative embodiments in which RAID controllers 114 and 116 may comprise any suitable RAID controller. First RAID controller 114 includes firmware 118 and memory 119. Second RAID controller 116 includes firmware 120 and memory 121. Firmware 118 and 120 preferably includes executable instructions for carrying out the functions described below. Firmware 118 and 120 are further able to utilize memory elements 119 and 121, respectively, to store information necessary to facilitate the functional steps described herein.

First server 110 is in operative communication with RAID 130 via connection 124. Second server 112 is in operative communication with RAID controller 130 via connection 126. Connections 124 and 126 may be for instance peripheral component interconnect (PCI), peripheral component interconnect express (PCIE) or PCIX-type connections or any other suitable connection for transmitting data between servers 110 and 112 and RAID 130.

Connection 122 connects first server 110 and second server 112. Connection 122 may be, for example, a CROSSOVER Cat 5 cable, a hub/switch with a straight Cat 5 cable, or another suitable connection. Connection 122 may preferably provide a link for facilitating communications using TCP/IP. The communication between the hosts 110 and 112 may preferably include a heart beat mechanism used by Oracle at the software layer.

In the present embodiment RAID 130 includes virtual disks 132, 134, 136 and 138. In the present embodiment, each virtual disk includes multiple physical disks (which may also be referred to as storage resources or storage drives). For instance first virtual disk 132 includes physical disks 140A-C. Second virtual disk 134 includes physical disks 142A-C. Virtual disk 136 includes physical disks 144A-C. Also fourth virtual disk 138 includes physical disks 146A-C. Although the present embodiment discloses the use of virtual disks with multiple physical disks associated with each virtual disk, the present disclosure contemplates the use of arrays with any number of different combinations of different virtual disks and physical disks.

In operation either RAID controller 114 or RAID controller 116 may act to manage a rebuild operation of a rebuild disk within RAID 130. For instance physical drive 140B of virtual drive 132 may have previously failed and been replaced with a replacement disk or a hot swap disk. This replacement disk, or "rebuild disk", then needs to have the data previously stored on the failed disk written to the replacement disk, via a RAID rebuild or recovery program.

The determination that a disk within RAID 130 has failed is known to those of skill in the art and are not discussed in detail herein, but may include determination that a drive is non responsive via a timing out operation, the use of status checks, a determination that no disk is within a particular drive, SCSI commands or other suitable techniques for determining that a disk within RAID 130 has failed.

Firmware 118 or 120 is able to determine whether another host or server is connected with and sharing RAID 130. Preferably, this step is performed during firmware initialization and may utilize SCSI read buffer and SCSI write buffer commands. If the firmware determines that no other host is sharing the RAID, the firmware assumes a "master controller" status. On the other hand, if firmware determines that another host is sharing RAID 130, the RAID controller firmware assumes a "slave controller" status. The master controller is then tasked with managing a rebuild operation of the disk being rebuilt within the RAID.

For example, supposing that first server 110 is first to connect with RAID 130, during the initialization of firmware 118, firmware 118 determines whether or not another host is sharing RAID 130. After determining that no other host is associated with RAID 130, firmware 118 assumes a master controller status. Subsequently second server 112 may connect with RAID 130 and during initialization of firmware 120 determines that another host (in this case first server 110) is sharing RAID 130. In this case RAID controller 116 adopts a slave status for the purpose of conducting rebuild operations on disks within RAID 130. Subsequently, after a rebuild is required within RAID 130, the master controller (in this case RAID controller 114) would then manage the rebuild of that drive.

The firmware on each controller 114 and 116 keeps a count of the number of transactions (writes) which it has successfully written to disk. During operation of first server 110 and second server 112 the respective RAID controllers 114 and 116 monitor the number of transactions (such as write requests) that are being executed by each respective RAID controller. The firmware of the master controller (in this case firmware 118) may then utilize this transaction history information to determine which RAID controller will facilitate a rebuild operation. In the event that firmware 118 determines that first RAID controller 114 is less busy than second RAID controller 116, firmware 118 would carry out a rebuild operation using RAID controller 114. However, in the instance where firmware 118 determines second RAID controller 116 to be less busy than first RAID controller 114, firmware 118 would then instruct second RAID controller 116 to carry out the rebuild operation to the rebuild disk.

The monitoring of write requests may be also referred to as the monitoring of a transaction level for a particular RAID controller. In preferred embodiments the transaction level also includes determining the number of transactions for a given or selected period of time.

Firmware 118 and 120 also monitors the a transaction level for a selected period for RAID controllers 114 and 116 respectively. The transaction level monitoring information of each respective RAID controller may be stored within memories 119 and 121, respectively. Additionally, first RAID controller is assigned to first SCSI ID and a second SCSI ID. More specifically, first RAID controller may be assigned a SCSI ID equal to six. Second RAID controller may preferably be assigned a SCSI ID equal to seven.

Now referring to FIG. 2, a flow diagram showing a method, indicated generally at 200 for proceeding with a rebuild operation is shown. The method begins 202 during firmware initialization 204 of a RAID controller that is connecting with a RAID in a shared disk environment. Next, the RAID controller firmware determines whether another host is presently connected to and sharing the RAID 206. For instance, SCSI read buffer and SCSI write buffer commands may be used to make this determination. In response to determining that no other host is sharing the RAID, the RAID controller will assume a master status with respect to rebuild operations 210. However, if the RAID controller determines that another host is currently sharing the RAID, the RAID controller will assume a slave status 208.

Next step, a failure of a drive within the storage resource is detected 214. Subsequently the master controller initiates a rebuild arbitration process 216.

Next, tables that show the history of transactions for peer RAID controllers are evaluated 218 in order to determine a less active controller 220. If a RAID controller is determined to be less active, the less active controller is assigned with authority to conduct the rebuild operation 224. However, in the event that a less active controller is not determined (for instance in the event that the two controllers have substantially equivalent transaction levels) the RAID controller may then use the SCSI IDs to determine which is highest and verifies that the node with the higher node or host with the higher SCSI ID is available 226. Next, the host with the highest SCSI ID is assigned authority to conduct the rebuild operation 228. In an alternative embodiment, the SCSI ID with the lower ID may be given authority to conduct the rebuild operation. In another alternative the rebuild operations may be alternated between higher and lower SCSI ID values. In still another embodiment, the master may conduct all rebuild operations (or instruct the slave to perform all rebuild operations) and may not monitor transaction levels. Lastly, rebuild is complete at 230.

Now referring to FIG. 3, a flow diagram indicated generally at 300 describes a method for managing a rebuild operation according to teachings of the present disclosure. The method begins at 302 with initialization of RAID controller firmware 306. Next, the RAID controller determines whether another host is connected with the RAID 308. In particular, if during firmware initialization firmware determines that no other hosts are associated or connected with the RAID, the firmware assumes that RAID controller is the master controller 312. One the other hand, if during the firmware initialization the firmware determines that another RAID controller is also sharing the RAID, the controller assumes a slave status 310.

Next, a RAID controller determines whether or not a drive within the RAID is degraded 314. If so, the RAID controller determines whether or not it has assumed master status 316. If the RAID controller is the master, the master then determines whether or not it is busier than the slave controller based upon transaction level 318. If the master is not busier than the slave, the master controller initiates rebuild operation 322.

In the event that the RAID controller determines that it is not the master 316, the RAID controller next determines whether or not the slave has been assigned to the rebuild 320. If not, the method proceeds to step 314. If the slave has been assigned to the rebuild, the method skips to step 334.

After determining that the master is busier than the slave, the master assigns the slave to perform the rebuild operation 324.

After the rebuild is initiated 322 by the master, a status update synchronization is conducted 326. During the status update/synchronization steps 326, 330, 334 and 338 represent a local update as well as a peer-to-peer update/communication that occurs between the two controllers 114 and 116. In a preferred embodiment the update synchronization step utilizes the SCSI command set including WRITE_BUFFER( ) and READ_BUFFER( ) commands to do complete the "Update/Synch." In the present preferred embodiment the "Update/Synch" is communicated via the storage link (SCSI BUS).

After rebuild is complete (at step 328) a status update synchronization 330 is conducted. Next, the method returns to step 314.

After the slave has been assigned to the rebuild operation, a status update/sync is conducted 334. Next, rebuild command is sent 336 from the master controller to the slave. Preferably, an acknowledgement from the slave will follow to ensure that both Master and Slave are properly synchronized.

At step 338 there is another status update/sync and it is determined whether the rebuild is complete 340. After the rebuild is complete 340, a status update/synchronization is conducted 330.

Although the disclosed embodiments have been described in detail, it should be understood that various changes, substitutions and alterations can be made to the embodiments without departing from their spirit and scope.

What is claimed is:

1. An information handling system, comprising:
a redundant array of independent disks (RAID) having a plurality of storage disks;
a first host in operative communication with the RAID and having a first RAID controller assigned as a master RAID controller; and
a second host in operative communication with the RAID and having a second RAID controller assigned as a slave RAID controller;
wherein a particular one of the RAID controllers is configured to:
compare a transaction level of the master RAID controller with a transaction level of the slave RAID controller; and
select either the master RAID controller or the slave RAID controller to perform a disk rebuild operation based at least on the results of the comparison between the transaction levels of the master RAID controller and the slave RAID controller.

2. An information handling system according to claim 1, wherein the particular RAID controller is configured to:
select the master RAID controller to perform the disk rebuild operation if the transaction level of the master RAID controller is lower than the transaction level of the slave RAID controller; and
select the slave RAID controller to perform the disk rebuild operation if the transaction level of the master RAID controller is higher than the transaction level of the slave RAID controller.

3. An information handling system according to claim 1, wherein:
the first RAID controller assumed the master RAID controller status in response to determining that no other host was sharing the RAID during initialization of the first RAID controller; and
the second RAID controller assumed the slave RAID controller status in response to determining that the first host was sharing the RAID during initialization of the second RAID controller.

4. An information handling system according to claim 1, wherein:
the transaction level of the master RAID controller is based on the number of transactions handled by the master RAID controller; and
the transaction level of the slave RAID controller is based on the number of transactions handled by the slave RAID controller.

5. An information handling system according to claim 1, wherein the RAID comprises a plurality of virtual disks.

6. An information handling system according to claim 1, wherein the particular RAID controller is configured to:
compare a first SCSI ID assigned to the first host with a second SCSI ID assigned to the second host; and
select either the master RAID controller or the slave RAID controller to perform a disk rebuild operation based at least on (a) the results of the comparison between the transaction levels of the master RAID controller and the slave RAID controller and (b) the results of the comparison between the first SCSI ID assigned to the first host with the second SCSI ID assigned to the second host.

7. An information handling system according to claim 1, wherein the particular RAID controller is configured to:
access a first SCSI ID assigned to the first host and a second SCSI ID assigned to the second host; and
if the master RAID controller and the slave RAID controller have a substantially equal transaction level, utilize the first SCSI ID and the second SCSI ID to select which RAID controller to perform the rebuild operation.

8. An information handling system according to claim 1, wherein the particular RAID controller comprises the master RAID controller.

9. A redundant array of independent disks (RAID) controller operable to communicate with a RAID in a shared disk environment, the RAID controller assigned as a master RAID controller and comprising:
logic instructions configured to:
compare a transaction level of the master RAID controller with a transaction level of a slave RAID controller in communication with the RAID; and
select either the master RAID controller or the slave RAID controller to perform a disk rebuild operation based at least on the results of the comparison between the transaction levels of the master RAID controller and the slave RAID controller.

10. A master RAID controller according to claim 9, further comprising logic instructions configured to:
select the master RAID controller to perform the disk rebuild operation if the transaction level of the master RAID controller is lower than the transaction level of the slave RAID controller; and
select the slave RAID controller to perform the disk rebuild operation if the transaction level of the master RAID controller is higher than the transaction level of the slave RAID controller.

11. A master RAID controller according to claim 9, the master RAID controller having assumed master RAID controller status in response to determining that no other host was sharing the RAID during initialization of the first RAID controller.

12. A master RAID controller according to claim 9, further comprising logic instructions configured to:
compare a first SCSI ID assigned to the first host with a second SCSI ID assigned to the second host; and
select either the master RAID controller or the slave RAID controller to perform a disk rebuild operation based at least on (a) the results of the comparison between the transaction levels of the master RAID controller and the slave RAID controller and (b) the results of the comparison between the first SCSI ID assigned to the first host with the second SCSI ID assigned to the second host.

13. A master RAID controller according to claim 9, further comprising logic instructions configured to:
access a first SCSI ID assigned to the first host and a second SCSI ID assigned to the second host; and
if the master RAID controller and the slave RAID controller have a substantially equal transaction level, utilize the first SCSI ID and the second SCSI ID to select which RAID controller to perform the rebuild operation.

14. A master RAID controller according to claim 9, wherein the logic instructions are embodied in firmware.

15. A master RAID controller according to claim 9, wherein:
the transaction level of the master RAID controller is based on the number of transactions handled by the master RAID controller; and
the transaction level of the slave RAID controller is based on the number of transactions handled by the slave RAID controller.

16. A method for managing a disk rebuild operation in a system including a redundant array of independent disks (RAID) having a plurality of storage disks, a first host coupled to the RAID and having a RAID controller assigned as a master RAID controller, and a second host coupled to the RAID and having a RAID controller assigned as a slave RAID controller, the method comprising:

monitoring a transaction level of the master RAID controller;

monitoring a transaction level of the slave RAID controller;

comparing the transaction level of the master RAID controller with the transaction level of a slave RAID controller; and selecting either the master RAID controller or the slave RAID controller to perform a disk rebuild operation based at least on the results of the comparison between the transaction levels of the master RAID controller and the slave RAID controller.

17. A method according to claim 16, further comprising:

selecting the master RAID controller to perform the disk rebuild operation if the transaction level of the master RAID controller is lower than the transaction level of the slave RAID controller; and selecting the slave RAID controller to perform the disk rebuild operation if the transaction level of the master RAID controller is higher than the transaction level of the slave RAID controller.

18. A method according to claim 16, further comprising:

the master RAID controller having assumed master status in response to determining that no other host was sharing the RAID during initialization of the master RAID controller; and the slave RAID controller having assumed slave status in response to determining that another host was sharing the RAID during initialization of the slave RAID controller.

19. A method according to claim 16, further comprising:

comparing a first SCSI ID assigned to the first host with a second SCSI ID assigned to the second host; and selecting either the master RAID controller or the slave RAID controller to perform a disk rebuild operation based at least on (a) the results of the comparison between the transaction levels of the master RAID controller and the slave RAID controller and (b) the results of the comparison between the first SCSI ID assigned to the first host with the second SCSI ID assigned to the second host.

20. A method according to claim 16, further comprising:

accessing a first SCSI ID assigned to the first host and a second SCSI ID assigned to the second host; and if the master RAID controller and the slave RAID controller have a substantially equal transaction level, utilizing the first SCSI ID and the second SCSI ID to select which RAID controller to perform the rebuild operation.

* * * * *